US011669717B2

(12) United States Patent
Shin et al.

(10) Patent No.: US 11,669,717 B2
(45) Date of Patent: Jun. 6, 2023

(54) METHOD AND DEVICE FOR COMPLETING SOCIAL NETWORK USING ARTIFICIAL NEURAL NETWORK

(71) Applicant: INDUSTRY-ACADEMIC COOPERATION FOUNDATION, YONSEI UNIVERSITY, Seoul (KR)

(72) Inventors: Won Yong Shin, Seoul (KR); Tien Cong Tran, Yongin-si (KR)

(73) Assignee: INDUSTRY-ACADEMIC COOPERATION FOUNDATION YONSEI UNIVERSITY, Seoul (KR)

( * ) Notice: Subject to any disclaimer, the term of this patent is extended or adjusted under 35 U.S.C. 154(b) by 336 days.

(21) Appl. No.: 16/900,609

(22) Filed: Jun. 12, 2020

(65) Prior Publication Data
US 2021/0110242 A1    Apr. 15, 2021

(30) Foreign Application Priority Data
Oct. 14, 2019   (KR) .......................... 10-2019-0126749

(51) Int. Cl.
*G06N 3/047*       (2023.01)
*G06F 16/901*      (2019.01)
(Continued)

(52) U.S. Cl.
CPC ......... *G06N 3/047* (2023.01); *G06F 16/9024* (2019.01); *G06N 3/08* (2013.01); *G06N 5/04* (2013.01)

(58) Field of Classification Search
CPC .......... G06N 3/0472; G06N 3/08; G06N 5/04; G06N 20/00; G06N 3/0454; G06N 7/005; G06N 3/02; G06F 16/9024
See application file for complete search history.

(56) References Cited

U.S. PATENT DOCUMENTS 10,693,739 B1 *   6/2020  Naseri ..................... H04L 41/12
2019/0130212 A1 * 5/2019  Cheng ................. G06F 18/2137

OTHER PUBLICATIONS

Mengyuan Chen et al.; Inference for Network Structure and Dynamics from Time Series Data via Graph Neural Network; arxiv; 10 pages; retrieved on Feb. 17, 2023 (Year: 2001).*
(Continued)

*Primary Examiner* — S. Sough
*Assistant Examiner* — Cuong V Luu (57) ABSTRACT

A device for completing a social network using an artificial neural network includes: a neural network unit configured to receive a target network having unrevealed missing nodes as input, infer the connections of the missing nodes with a neural network, and output multiple candidate complete networks according to various node sequences; and a selection unit configured to select one of the candidate complete networks outputted by the neural network unit, where the neural network unit outputs the candidate complete networks by using weights of a graph-generating neural network that has learned graph structures of reference networks having attributes similar to those of the target network, and the selection unit uses connection probability vectors obtained from the learned graph-generating neural network to select the candidate complete network probabilistically having a structure closest to that of the target network based on the connection probability vectors.

10 Claims, 8 Drawing Sheets

(51) Int. Cl.
  *G06N 5/04* (2023.01)
  *G06N 3/08* (2023.01)

(56) References Cited

OTHER PUBLICATIONS

Myunghwan Kim and Jure Leskovec, "The Network Completion Problem: Inferring Missing Nodes and Edges and in Networks," Proceedings of the Eleventh SIAM International Conference on Data Mining, SDM 2011 (Apr. 28, 2011).

Antonino Freno et al., "Learning to Recommend Links using Graph Structure and Node Content." Neural Information Processing Systems Workshop on Choice Models and Preference Learning (Nov. 16, 2011.).

Jiaxuan You et al., "GraphRNN: Generating Realistic Graphs with Deep Auto-regressive Models," arXiv : 1802.08773v3 [cs.LG] (Jun. 23, 2018).

"Network Completion Based on a Deep Generative Graph Model" Cong Tran and Won-Yong Shin "DeepNC: Deep Generative Network Completion" Cong Tran, Student Member, IEEE, Won-Yong Shin, Senior Member. Jul. 17, 2019.

\* cited by examiner

| 0 | 1 | 1 | 1 | 0 | 0 | 0 | 0 | 0 |
|---|---|---|---|---|---|---|---|---|
| 1 | 0 | 1 | 0 | 0 | 0 | 0 | 0 | 0 |
| 1 | 1 | 0 | 1 | 0 | 0 | 0 | 0 | 0 |
| 1 | 0 | 1 | 0 | 1 | 1 | 0 | 0 | 0 |
| 0 | 0 | 0 | 1 | 0 | 1 | 1 | 1 | 0 |
| 0 | 0 | 0 | 1 | 1 | 0 | 1 | 1 | 0 |
| 0 | 0 | 0 | 0 | 1 | 1 | 0 | 1 | 1 |
| 0 | 0 | 0 | 0 | 1 | 1 | 1 | 0 | 0 |
| 0 | 0 | 0 | 0 | 0 | 0 | 1 | 0 | 0 |

Adjacency matrix (A)

METHOD AND DEVICE FOR COMPLETING SOCIAL NETWORK USING ARTIFICIAL NEURAL NETWORK

CROSS-REFERENCE TO RELATED APPLICATIONS

This application claims priority under 35 U.S.C. 119(a) to Korean Patent Application No. 10-2019-0126749, filed with the Korean Intellectual Property Office on Oct. 14, 2019, the disclosure of which is incorporated herein by reference in its entirety.

BACKGROUND

1. Technical Field

The present disclosure relates to completing a social network, more particularly to a method and device for completing a social network using an artificial neural network.

2. Description of the Related Art

With various types of social networking services provided in recent times, users can maintain various friend relationships over social networking services. In a social network, the connections between users may be utilized for various purposes.

For example, the friend relationships between users can be used to identify a user community, and such a community can be utilized for the purpose of marketing targeted at certain users, analysis of user preferences, downstream mining, and the like.

However, certain users may not reveal their friend relationships, and such unrevealed friend relationships make it difficult to identify the complete structure of a social network. Unrevealed friend relationships acts as obstacles to clearly identifying the structural characteristics of a particular social network, and various attempts have been made to infer unrevealed friend relationships.

Predicting the true network by inferring the unrevealed friend relationships in a social network in this manner is referred to as network completion. Since unrevealed friend relationships are information of which the true values cannot be known, there is an inherent limit to how accurately a network can be completed.

Various algorithms for network completion have been presented, of which a representative method is the Kronecker based network completion method. However, the Kronecker based network completion method is used under the assumption that the network follows a pure power law, there is the problem that the network completion may become very inaccurate if the network does not follow such a power law structure.

SUMMARY

An aspect of the disclosure proposes a method and device for network completion using an artificial neural network that can overcome the limit of social networks of being unable to obtain true data and can infer missing nodes with comparatively high accuracy.

To achieve the objective above, an aspect of the disclosure provides a network completion device that includes: a neural network unit configured to receive a target network having unrevealed missing nodes as input, infer the connections of the missing nodes by way of a neural network, and output a multiple number of candidate complete networks according to various node sequences; and a selection unit configured to select one of the multiple candidate complete networks outputted by the neural network unit, where the neural network unit outputs the multiple candidate complete networks by using weights of a graph-generating neural network that has learned graph structures of reference networks having attributes similar to those of the target network, and the selection unit uses connection probability vectors obtained from the learned graph-generating neural network to select the candidate complete network probabilistically having a structure closest to that of the target network based on the connection probability vectors.

Sequence information that configures an arbitrary sequence for the observable nodes and the missing nodes requiring inferring in the target network may be inputted to the neural network unit, and the neural network unit may output the candidate complete networks according to the sequence information.

The learned graph-generating neural network may configure the weights by learning a function ($f_{trans}$) related to the topologies of the reference networks and a function ($f_{out}$) related to connection probability.

The learned graph-generating neural network may generate a graph by using the function related to the topologies of the reference networks and the function related to the connection probability to sequentially paint nodes.

A connection probability vector may include probability information related to connections of a graph topology generated by way of the graph-generating neural network.

The selection unit may select one of the candidate complete networks based on the equation shown below:

$$\hat{G} = \underset{G}{\operatorname{argmax}} \ P(G \mid G_O, \theta),$$

where G represents the candidate complete networks, $G_O$ represents the inputted target network, $\theta$ represents a connection probability vector, and $\hat{G}$ represents the selected candidate complete network.

Another aspect of the disclosure provides a network completion method that includes: (a) receiving a target network having unrevealed missing nodes as input, inferring connections of the missing nodes by way of a neural network, and outputting a multiple number of candidate complete networks according to various node sequences; and (b) selecting one of the plurality of candidate complete networks outputted in step (a), where step (a) outputs the multiple candidate complete networks by using weights of a graph-generating neural network that has learned a graph structure of reference networks having attributes similar to those of the target network, and step (b) uses a connection probability vector obtained from the learned graph-generating neural network to select a candidate complete network probabilistically having the structure closest to that of the target network based on the connection probability vector.

An embodiment of the disclosure makes it possible to overcome the limit of social networks of being unable to obtain true data and makes it possible to infer missing nodes with comparatively high accuracy.

Additional aspects and advantages of the present disclosure will be set forth in part in the description which follows,

DETAILED DESCRIPTION

A description of the present invention is provided below with reference to the accompanying drawings. However, the invention can be implemented in many different forms and thus is not limited to the embodiments described herein.

For a clear description of the invention, parts of little relevance to the descriptions have been omitted in the drawings, and throughout the specification, like reference numerals have been designated to like parts.

Throughout the specification, mention of a certain part being "connected" to another part includes not only cases of being "directly connected" but also cases of being "indirectly connected" by way of another member positioned in-between.

Also, mention of a certain part "including" a certain element does not preclude the inclusion of other elements and can mean another element can be included additionally unless there is an explicit statement to the contrary.

Certain embodiments of the disclosure are described below in greater detail with reference to the accompanying drawings.

Figure 1:
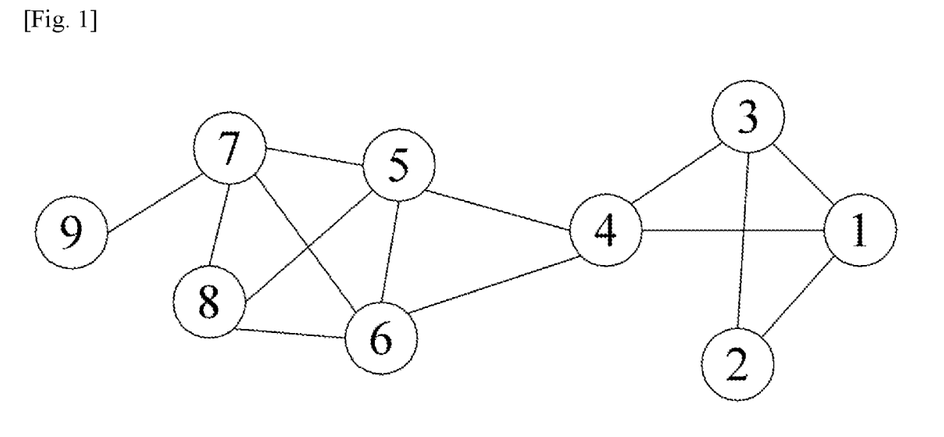
FIG. 1 illustrates the structure of a typical social network.
Figure 2:
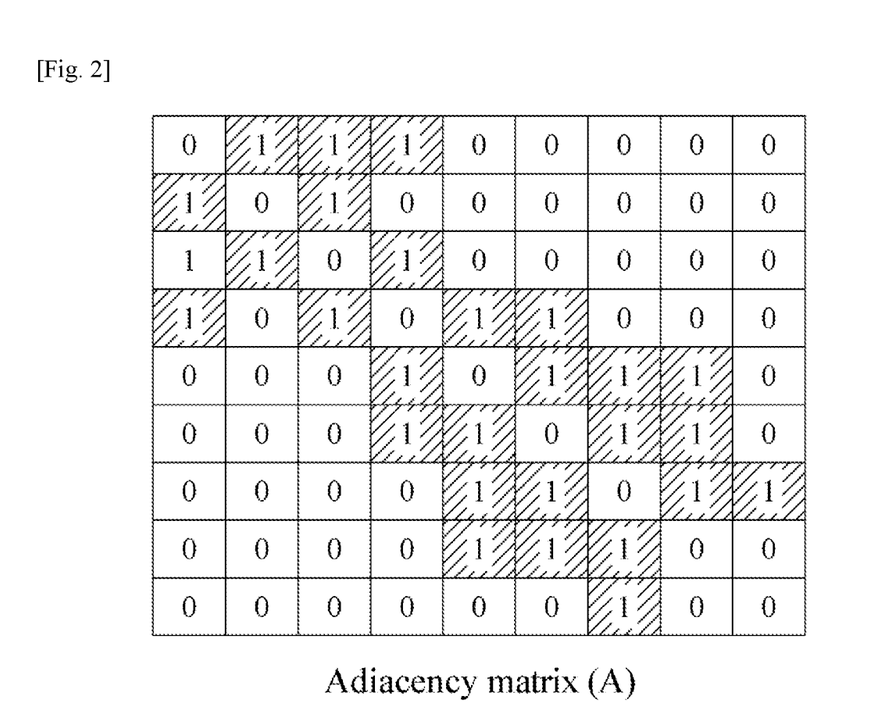
FIG. 2 shows a matrix representing connections between the nodes forming the social network illustrated in FIG. 1.

FIG. 1 illustrates the structure of a typical social network, and FIG. 2 shows a matrix representing connections between the nodes forming the social network illustrated in FIG. 1.

Referring to FIG. 1, each of the nodes shown in FIG. 1 is a user forming the social network. In FIG. 1, a particular node is connected with other nodes. For example, node #1 is connected with node #2, node #3, and node #4, and the connections of the node mean that the user of node #1 has a friend relationship with the user of node #2, the user of node #3, and the user of node #4.

In a social network such as Facebook or Instagram, users are connected in various relationships, and such connections between users offer information useful for discovering the user community. A community discovered through the connections between users can be used for various marketing and information provision strategies.

In the matrix illustrated in FIG. 2 that represents the connections between network users, each column and each row represent a node number, where a mark of 1 means that there is a friend relationship between the users corresponding to the column and row, while a mark of 0 means that there is no friend relationship between the users corresponding to the column and row.

A network connection topology such as that illustrated in FIG. 1 can be expressed in the form of vectors by way of a connection matrix such as that shown in FIG. 2.

However, quite a few social network users may refrain from revealing friend relationships with other users. Thus, it may be difficult to accurately identify a social network due to users who do not reveal friend relationships, and this may be a major cause of inaccuracy in discovering a community. Inaccuracy in the discovery of a community can lead to inadequate marketing and information provision, and identifying unrevealed friend relationships can be necessary for various reasons.

Figure 3:
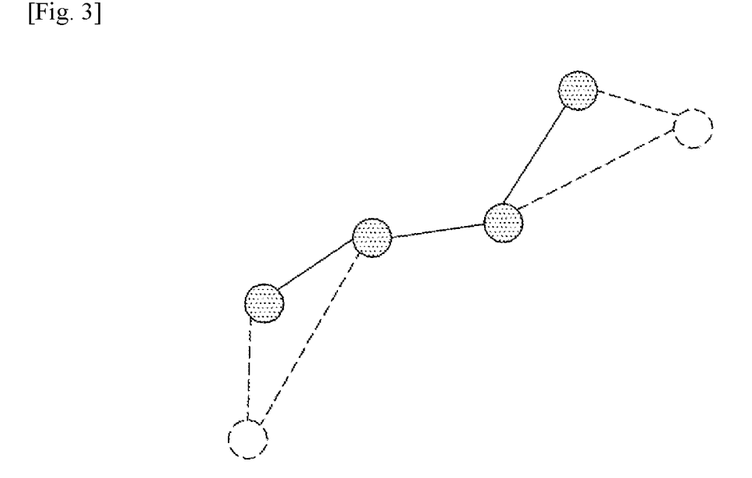
FIG. 3 shows an example of a social network that includes unrevealed friend relationships.

FIG. 3 shows an example of a social network that includes unrevealed friend relationships.

In FIG. 3, nodes expressed by solid lines are observable nodes (users), and nodes expressed by dotted lines are nodes that are hidden due to unrevealed friend relationships. In the present specification, an observable node is defined a 'visible node', and a hidden node is defined a 'missing node'.

Typically when observing a network, only the visible nodes and the relationships between visible nodes are observed, and the presence of missing nodes and the connections of the missing nodes are not observed.

Recovering the unobserved missing nodes and the connections between the missing nodes is referred to as completing a network, and the present disclosure relates to such network completion. Ultimately, the present disclosure aims to recover the missing nodes and the connections between missing nodes that are hidden in a particular social network in which only visible nodes are observed.

Figure 4:
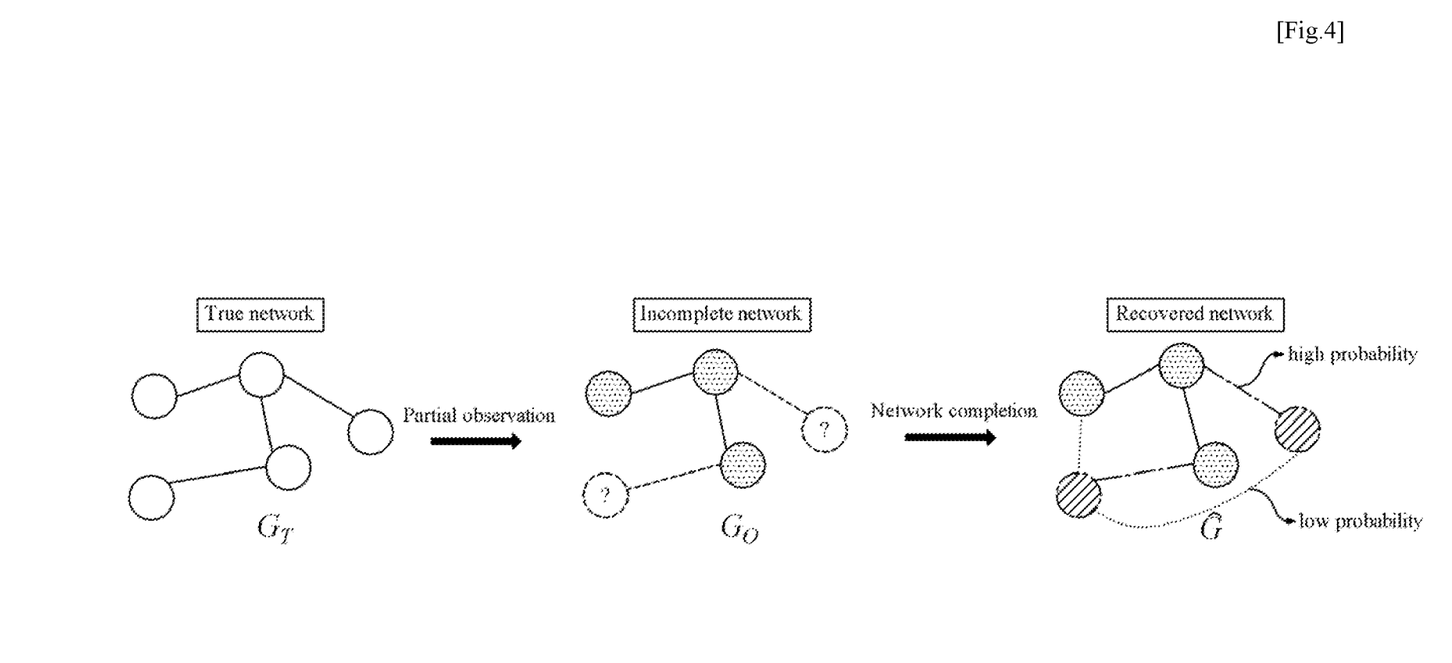
FIG. 4 illustrates a method of completing a network according to an embodiment of the disclosure.

FIG. 4 illustrates a method of completing a network according to an embodiment of the disclosure.

The network shown on the left in FIG. 4 is the true network $G_T$ and is a network in which the visible nodes and missing nodes as well as the connections between all of the nodes are shown. The network $G_O$ shown in the middle is the network that is actually observed. The missing nodes, marked with question marks, cannot actually be observed. FIG. 4 illustrates an example in which two nodes are missing nodes.

The network completion intended by the present disclosure is to infer the missing nodes and the connections of the missing nodes from the network $G_O$ in which the missing nodes are not observed, and the completed network is illustrated on the right in FIG. 4.

The present disclosure recovers the missing nodes and the connections of missing nodes of a particular social network through an artificial neural network. The learning of a typical artificial neural network is performed using label information named 'ground truth'. However, obtaining label information for missing nodes and connections of the missing node may realistically be quite difficult. Therefore, the disclosure proposes a method for completing a network that can recover the hidden missing nodes and the connections of the missing nodes without using ground truths.

Figure 5:
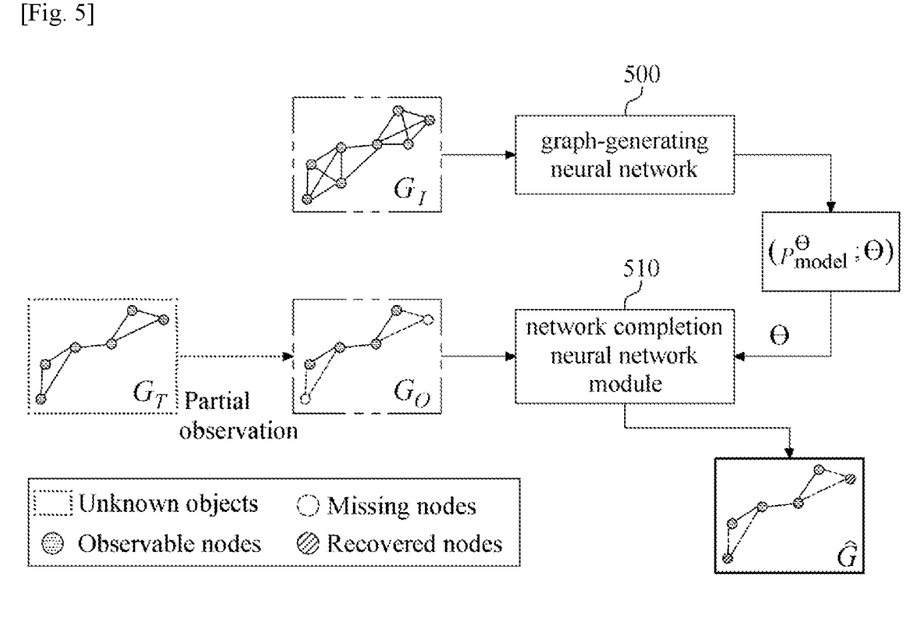
FIG. 5 illustrates a structure for learning a network completion device according to an embodiment of the disclosure.

FIG. 5 illustrates a structure for learning a network completion device according to an embodiment of the disclosure.

Referring to FIG. 5, a network completion device according to an embodiment of the disclosure may perform learning by using a graph-generating neural network 500. The graph-generating neural network 500 may be a neural network used conventionally for generating various forms of graphs. An embodiment of the disclosure may regard a social network as a kind of graph and may learn the graph-generating neural network 500 to complete the network.

As the learning material for the learning of the graph-generating neural network 500, a reference social network may be utilized that has attributes similar to those of the social network subject to network recovery. For example, if the social network subject to network recovery is a social network of male students in a first university situated in Sinchon, then another social network having similar attributes may be utilized as learning material. For example, a social network of male students in a second university situated in Sinchon may be utilized as a reference network and utilized as the learning material for the graph-generating neural network 500.

The graph-generating neural network 500 may use various reference social networks inputted as learning material to learn the structure of social networks having similar attributes. More specifically, the graph-generating neural network 500 may output connection probability vectors θ through the learning. A connection probability vector may be a vector that represents probability information of the connections of nodes forming the network.

The specific structures of the connection probability vectors outputted through the learning of the graph-generating neural network 500 and the detailed learning method will be described with reference to separate drawings.

After the learning at the graph-generating neural network 500 is finished, the completion of the social network including missing nodes may be performed at the network completion neural network module 510. The social network $G_O$ that is the object of the completion may be inputted to the network completion neural network module 510. The inputted social network may include only visible nodes and connections between the visible nodes, and the network completion neural network module 510 may infer the missing nodes and the connections of the missing nodes from the inputted social network to perform network completion.

The connection probability vectors obtained through the learning at the graph-generating neural network 500 may be inputted to the network completion neural network module 510, and the network completion neural network module 510 may infer the missing nodes and the connections of the missing nodes based on the connection probability vectors.

As described above, it may be difficult to acquire true data regarding unrevealed friend relationships, and the present disclosure may use the graph-generating neural network 500 to perform network completion for a social network having such properties. To this end, a social network may be converted into vector information for graph generation, after which learning may be performed at the graph-generating neural network 500. Also, since there is no true data acquired, a social network for a reference group having similar attributes may be learned in the form of a graph at the graph-generating neural network 500.

The above provides an overview of the disclosure, described with reference to FIG. 5, and the following provides a description on the specific structures and operations of the graph-generating neural network 500 and the network completion neural network module 510.

Figure 6:
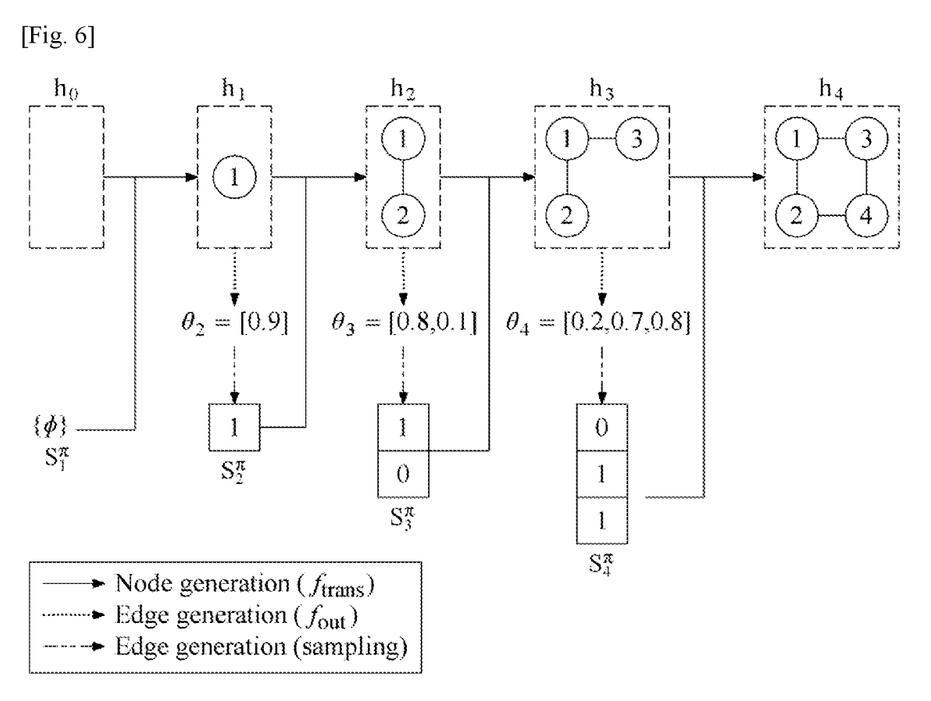
FIG. 6 is a diagram conceptually illustrating the inference process of a graph-generating neural network 500 according to an embodiment of the disclosure.

FIG. 6 is a diagram conceptually illustrating the inference process of a graph-generating neural network 500 according to an embodiment of the disclosure.

The graph-generating neural network 500 is not a neural network for learning a network structure but rather a neural network for painting a graph. The graph-generating neural network 500 may be a neural network that infers the feature information of the learned graphs and learns graph painting based on the inferred feature information. An embodiment of the disclosure takes advantage of the fact that a network structure is similar to a graph structure and thus may use a graph-generating neural network 500. Such use of the graph-generating neural network 500 is an important feature of the disclosure.

The graph-generating neural network 500 may infer two types of information based on the inputted network structure, where the two types of information inferred include graph topology vectors and connection probability vectors.

A graph topology vector is a vector that represents the topology structure of a graph. For example, in FIG. 6, the final generated graph is a graph in which 1-2-4-3-1 are connected, and such a graph structure represented in vector form is a graph topology vector.

A connection probability vector is a vector related to probability information for connections of the nodes forming the graph. For example, in FIG. 6, node #1 and node #2 are connected, and information on the probability of node #1 and node #2 being connected may be included in the connection probability vector, and the connection probability vectors may include probability information for all connections of the graph.

The graph-generating neural network 500 may learn graph generation in the manner of sequentially painting the nodes forming the graph, where the sequence of the painted nodes may be provided beforehand.

From the perspective of network completion, the total number of nodes of the graph that must be generated is the sum value of the number of visible nodes $|V_O|$ and the number of missing nodes $|V_M|$. Here, the number of permutations for possible sequences of the nodes is $(|V_O|+|V_M|)!$.

The graph topology vector for a given node sequence may be expressed as Equation 1 shown below.

$$S^\pi \triangleq (S_1^\pi, \ldots, S_{|V_O|+|V_M|}^\pi) \quad \text{[Equation 1]}$$

In Equation 1 above, the i of $S_i^\pi$ represents the indexes of the sequentially painted (generated) nodes, and $S_i^\pi$ is a vector representing the connections of nodes at the i-th sequence.

Referring to FIG. 6, $S_1^\pi$ begins at an empty set. The first node, node #1, may be generated at h1, and the connection of the subsequently generated node may be recorded in $S_2^\pi$. In FIG. 6, $S_2^\pi$ is defined as {1}, and this means that the subsequently generated node will be connected with node #1. Also, the probability information for the connection of $S_2^\pi$ may be recorded in $\theta_2$. FIG. 6 illustrates an example in which $\theta_2$ is 0.9, which means that the probability of node #1 and the subsequently generated node being connected is 0.9.

At h2, the next node, node #2, may be generated based on $S_2^\pi$. Since $S_2^\pi$ is {1}, it can be seen from h2 that the subsequently generated node #2 will be generated to be connected with node #1.

$S_3^\pi$ is defined as {1,0}, which represents the connections between the subsequently generated node #3 and the previously generated nodes in a sequential manner, and {1,0} means that the subsequently generated node #3 is connected with node #1 but not connected with node #2. Here, $\theta_3$ is set as {0.8, 0.1}, which means that the probability of node #1 and node #3 being connected is 0.8 and the probability of node #2 and node #3 being connected is 0.1.

At h3, node #3 is illustrated which, based on $S_3^\pi$, is connected with node #1 and not connected with node #2.

$S_4^\pi$ is set as $\{0, 1, 1\}$, which represents the connections between the subsequently generated node #4 and the previously generated nodes and means that node #4 is not connected with node #1 but is connected with node #2 and node #3. $\theta_4$ is set as $\{0.2, 0.7, 0.8\}$, which represents the probability information for the connections of $S_4^\pi$.

At h4, node #4 is illustrated which, based on $S_4^\pi$, is connected with nodes #2 and #3 but not connected with node #1.

$S_i^\pi$ forming the graph topology vector can be expressed as Equation 2 shown below.

$$S_i^\pi = (a_{1,i}^\pi, \ldots, a_{i-1,i}^\pi), \forall i \in \{2, \ldots, |V_O| + |V_M|\} \quad \text{[Equation 2]}$$

In Equation 2 above, $a_{u,v}^\pi$ represents the connection with the (u,v)-th node.

Also, the probability distribution for the graph topology vectors can be expressed as Equation 3 shown below.

$$p(S^\pi) = \prod_{i=2}^{|V_O|+|V_M|} p(S_i^\pi \mid S_1^\pi, \cdots, S_{i-1}^\pi) \quad \text{[Equation 3]}$$

The probability distribution of Equation 3 above, which may be a probability distribution for graph topolgies, can be defined as the probability of the graph of a particular topology following the learned graph structure and can be obtained in the form of a conditional probability as in Equation 3 above.

According to an embodiment of the disclosure, the graph-generating neural network 500 can include a network of an RNN structure.

A graph-generating neural network 500 of an RNN structure may learn probability information for graph topologies and connections of the graph topologies. More specifically, the graph-generating neural network can be defined as learning two functions, $f_{trans}$ related to topology and Gut related to connection probability, where $f_{trans}$ and Gut can be defined by Equation 4 and Equation 5 shown below.

$$h_i = f_{trans}(h_{i-1}, S_i^\pi) \quad \text{[Equation 4]}$$

$$\theta_{i+1} = f_{out}(h_i) \quad \text{[Equation 5]}$$

$f_{trans}$ and $f_{out}$ of the graph-generating neural network may be formed by learning, and the weights of these functions may be determined by learning.

From the graph-generating neural network learned using a reference network, the connection probability vectors, $\theta$, may be obtained, and an embodiment of the disclosure may complete the target network using the obtained $\theta$.

As described above, an embodiment of the disclosure may use the network completion neural network module 510 to perform network completion, and the connection probability vectors $\theta$ may be inputted to the network completion neural network module 510.

The target network $G_O$ including missing nodes may be formed by using the neural network of the network completion neural network module 510 and the connection probability vectors $\theta$.

Figure 7:
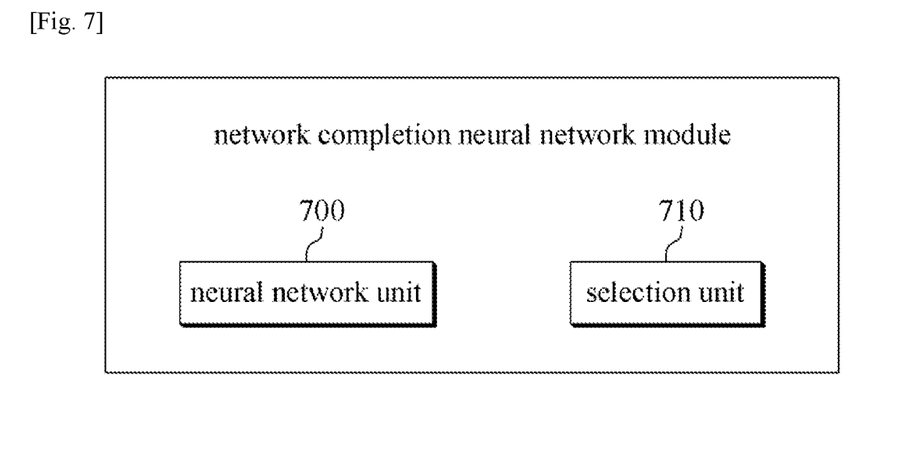
FIG. 7 is a diagram conceptually illustrating structure of a network completion neural network module 510 according to an embodiment of the disclosure.

FIG. 7 is a diagram conceptually illustrating structure of a network completion neural network module 510 according to an embodiment of the disclosure.

Referring to FIG. 7, a network completion neural network module according to an embodiment of the disclosure may include a neural network unit 700 and a selection unit 710.

The neural network unit 700 may be a neural network that follows the weights of the already learned graph-generating neural network 500. A node sequence including missing nodes may be inputted to the neural network unit 700, and the neural network unit 700 may complete the graph structure based on the learned weights.

Figure 8:
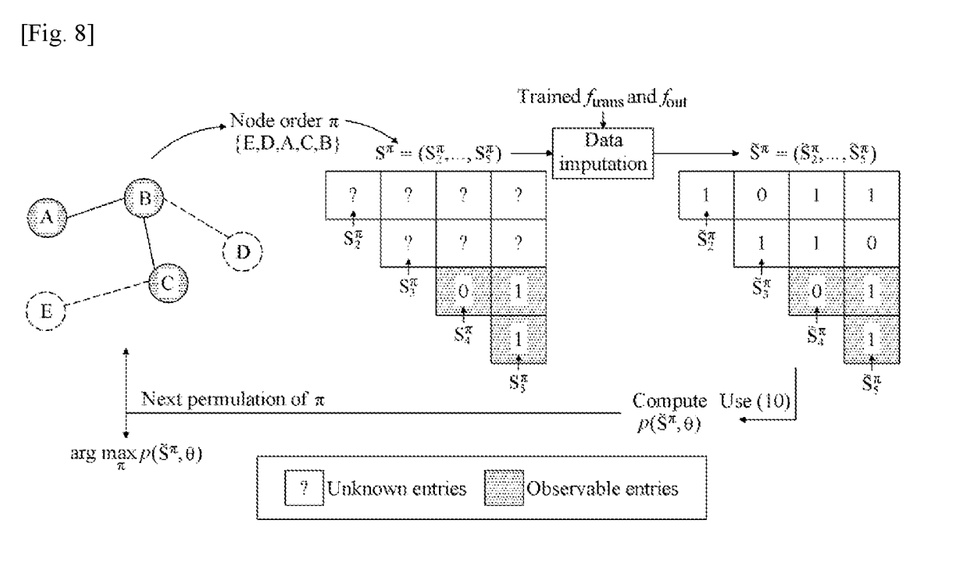
FIG. 8 shows an example of a graph completion process at a neural network unit 700 according to an embodiment of the disclosure.

FIG. 8 shows an example of a graph completion process at a neural network unit 700 according to an embodiment of the disclosure.

FIG. 8 illustrates an example in which three nodes A, B, and C are visible nodes and D and E are missing nodes. The number of missing nodes may be configured beforehand and a particular sequence of nodes, including missing nodes, may be inputted to the neural network unit 700 according to an embodiment of the disclosure.

FIG. 8 illustrates an example in which the sequence for painting (generating) nodes is $\{E, D, A, C, B\}$. Here, E and D are missing nodes of which the connections are unknown.

As illustrated in FIG. 8, the neural network unit 700 may complete the network in a particular sequence by using $f_{trans}$ and $f_{out}$, which follow the already learned weights, to infer $S_i^\pi$. In FIG. 8, the connections of D and E, which are missing nodes, may initially be marked as ?, because these are unknown, but $S_i^\pi$ may be inferred by using the learned $f_{trans}$ and $f_{out}$.

The neural network unit 700 may perform network completion for all possible sequences including the missing nodes to output candidate complete networks. If there are three visible nodes and two missing nodes as in FIG. 8, the total number of permutations would be 5!, and there would be a total of 120 cases.

The selection unit 710 may perform the final network completion by selecting one candidate complete network from among the multiple number of candidate complete networks. The selection unit 710 may select the final complete network by using the connection probability vectors $\theta$ obtained from the learned graph-generating neural network 500.

From among each of the candidate complete networks, the selection unit 710 may select the candidate complete network which, based on the connection probability vectors, has the highest similarity probability with the inputted target network $G_O$. Such selection of the complete network can be expressed as Equation 6 shown below.

$$\hat{G} = \underset{G}{\operatorname{argmax}} \, P(G \mid G_O, \theta) \quad \text{[Equation 6]}$$

As Equation 6 above, the selection unit 710 may select the complete network G of a particular sequence having a structure probabilistically the most similar to the target network from among the candidate complete networks G, based on the connection probability vectors $\theta$.

The network completion based on the present disclosure described with reference to FIG. 7 and FIG. 8 is for illustration only and can be modified in various ways. For example, the candidate complete networks may not necessarily be outputted for all possible permutations. The selection process can be performed after outputting the candidate complete networks only for certain potentially feasible permutations.

The description of the disclosure provided above is for illustrative purposes only, and a person having ordinary skill in the field of art to which the present disclosure pertains would understand that variations into different specific forms can be easily implemented without departing from the technical spirit or changing the essential features of the disclosure.

Therefore, it should be understood that, in all aspects, the embodiments presented above all illustrative only and are not limiting.

For example, an element described as having an integrated form can be practiced in a distributed form, and likewise, elements described as having a distributed form can be practiced in a combined form.

The scope of the disclosure is defined by the scope of claims below, and it is to be understood that the meaning and scope of the claims as well as all modifications and variations derived from their equivalent concepts are encompassed within the scope of the present disclosure.

What is claimed is:

1. A network completion device comprising:
   a neural network unit configured to receive input of a target network having unrevealed missing nodes, infer connections of the missing nodes by way of a neural network, and output a plurality of candidate complete networks according to various node sequences; and
   a selection unit configured to select one of the plurality of candidate complete networks outputted by the neural network unit,
   wherein the neural network unit outputs the plurality of candidate complete networks by using weights of a graph-generating neural network, wherein the graph-generating neural network has a learned graph structure of reference networks having the same attributes as attributes of the target network,
   the selection unit uses a connection probability vector obtained from the graph-generating neural network to select a candidate complete network probabilistically having a structure closest to a structure of the target network based on the connection probability vector, and
   the selection unit selects one of the candidate complete networks based on an equation shown below:

$$\hat{G} = \underset{G}{\operatorname{argmax}}\ P(G\mid G_O, \theta),$$

where G represents the candidate complete networks, $G_O$ represents the target network, $\theta$ represents the connection probability vector, and $\hat{G}$ represents the selected candidate complete network.

2. The network completion device of claim 1, wherein sequence information is inputted to the neural network unit, the sequence information configuring an arbitrary sequence for observable nodes and missing nodes requiring inferring in the target network, and the neural network unit outputs the candidate complete networks according to the sequence information.

3. The network completion device of claim 1, wherein the graph-generating neural network configures the weights by learning a function (ftrans) related to a topology of the reference networks and a function (fout) related to a connection probability.

4. The network completion device of claim 3, wherein the graph-generating neural network generates a graph by using the function related to the topology of the reference networks and the function related to the connection probability to sequentially paint nodes.

5. The network completion device of claim 1, wherein the connection probability vector includes probability information related to connections of a graph topology generated by way of the graph-generating neural network.

6. A network completion method comprising:
   (a) receiving input of a target network having unrevealed missing nodes, inferring connections of the missing nodes by way of a neural network, and outputting a plurality of candidate complete networks according to various node sequences; and
   (b) selecting one of the plurality of candidate complete networks outputted in said step (a),
   wherein said step (a) outputs the plurality of candidate complete networks by using weights of a graph-generating neural network, wherein the graph-generating neural network has a graph structure of reference networks having the same attributes as attributes of the target network,
   said step (b) uses a connection probability vector obtained from the graph-generating neural network to select a candidate complete network probabilistically having a structure closest to a structure of the target network based on the connection probability vector, and
   said step (b) selects one of the candidate complete networks based on an equation shown below:

$$\hat{G} = \underset{G}{\operatorname{argmax}}\ P(G\mid G_O, \theta),$$

where G represents the candidate complete networks, $G_O$ represents target network, $\theta$ represents the connection probability vector, and $\hat{G}$ represents the selected candidate complete network.

7. The network completion method of claim 6, wherein sequence information is inputted in said step (a), the sequence information configuring an arbitrary sequence for observable nodes and missing nodes requiring inferring in the target network, and the candidate complete networks are outputted according to the sequence information.

8. The network completion method of claim 6, wherein the graph-generating neural network configures the weights by learning a function (ftrans) related to a topology of the reference networks and a function (fout) related to a connection probability.

9. The network completion method of claim 8, wherein the graph-generating neural network generates a graph by using the function related to the topology of the reference networks and the function related to the connection probability to sequentially paint nodes.

10. The network completion method of claim 6, wherein the connection probability vector includes probability information related to connections of a graph topology generated by way of the graph-generating neural network.

* * * * *